United States Patent
Okusa et al.

(10) Patent No.: US 11,686,741 B2
(45) Date of Patent: Jun. 27, 2023

(54) AUTOMATIC ANALYZER

(71) Applicant: Hitachi High-Tech Corporation, Tokyo (JP)

(72) Inventors: Takenori Okusa, Tokyo (JP); Susumu Sakairi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 490 days.

(21) Appl. No.: 16/644,111

(22) PCT Filed: Jul. 6, 2018

(86) PCT No.: PCT/JP2018/025704
§ 371 (c)(1),
(2) Date: Mar. 3, 2020

(87) PCT Pub. No.: WO2019/073644
PCT Pub. Date: Apr. 18, 2019

(65) Prior Publication Data
US 2020/0209272 A1 Jul. 2, 2020

(30) Foreign Application Priority Data
Oct. 11, 2017 (JP) .................................. 2017-197841

(51) Int. Cl.
*G01N 35/10* (2006.01)
*G01N 35/04* (2006.01)

(52) U.S. Cl.
CPC ......... *G01N 35/1009* (2013.01); *G01N 35/04* (2013.01); *G01N 2035/0441* (2013.01)

(58) Field of Classification Search
CPC ............... G01N 35/1009; G01N 35/04; G01N 2035/0441; G01N 2035/0491; G01N 35/1011
See application file for complete search history.

(56) References Cited

U.S. PATENT DOCUMENTS

| | | |
|---|---|---|
| 4,046,248 A | 9/1977 | Goffredo et al. |
| 4,325,910 A | 4/1982 | Jordan |
| (Continued) | | |

FOREIGN PATENT DOCUMENTS

| | | |
|---|---|---|
| EP | 0 867 724 A2 | 9/1998 |
| JP | 3-285175 A | 12/1991 |
| (Continued) | | |

OTHER PUBLICATIONS

International Search Report (PCT/ISA/210) issued in PCT Application No. PCT/JP2018/025704 dated Sep. 11, 2018 with English translation (eight (8) pages).

(Continued)

*Primary Examiner* — Jill A Warden
*Assistant Examiner* — John McGuirk
(74) *Attorney, Agent, or Firm* — Crowell & Moring LLP

(57) ABSTRACT

The object of the invention is to realize an automatic analyzer capable of suppressing an increase in cost without greatly changing the configuration even when the configuration of an inspection system is changed, and reducing burden of an operator. A pin to be fitted into a hole formed in a specimen container conveying unit is formed on a specimen container conveying unit mounting surface at a position below a specimen suction position, and it is possible to make relative positions between components of a specimen dispensing unit and the specimen container conveying unit at the time of a specimen dispensing operation, as well as driving conditions when moving each axis of the specimen dispensing unit identical even when the types of the specimen container conveying unit are different, and it is possible to ensure stability of the same specimen dispensing operation before and after changing the specimen container conveying unit. Although it is necessary for an operator to memorize a procedure of maintenance work relating to the (Continued)

FIGURE VIEWING FROM
ARROW DIRECTION OF A specimen container conveying unit, work procedures relating to other units of the automatic analyzer are not changed and it is not necessary to memorize new maintenance procedures of the other units, and thus the burden of the operator can be reduced.

11 Claims, 10 Drawing Sheets

(56) References Cited

U.S. PATENT DOCUMENTS

| | | | |
|---|---|---|---|
| 5,207,986 | A | 5/1993 | Kadota et al. |
| 6,019,945 | A | 2/2000 | Ohishi et al. |
| 2006/0083660 | A1 | 4/2006 | Schorno et al. |
| 2006/0204997 | A1 | 9/2006 | Macioszek et al. |
| 2011/0076194 | A1 | 3/2011 | Kitagawa et al. |

FOREIGN PATENT DOCUMENTS

| | | |
|---|---|---|
| JP | 10-325839 A | 12/1998 |
| JP | 2000-28621 A | 1/2000 |
| JP | 2008-180638 A | 8/2008 |
| JP | 5439107 B2 | 3/2014 |

OTHER PUBLICATIONS

Japanese-language Written Opinion (PCT/ISA/237) issued in PCT Application No. PCT/JP2018/025704 dated Sep. 11, 2018 (six (6) pages).

Japanese-language International Preliminary Report on Patentability (PCT/IPEA/409) issued in PCT Application No. PCT/JP2018/025704 dated Oct. 21, 2019 (four (4) pages).

International Preliminary Report on Patentability (PCT/IB/338) issued in PCT Application No. PCT/JP2018/025704 dated Apr. 16, 2020, including English translation of document C3 (Japanese-language International Preliminary Report on Patentability (PCT/IPEA/409) previously filed on Mar. 3, 2020 (seven (7) pages).

Extended European Search Report issued in European Application No. 18865969.2 dated May 14, 2021 (18 pages).

FIGURE VIEWING FROM
ARROW DIRECTION OF B

C CROSS-SECTION

FIGURE VIEWING FROM
ARROW DIRECTION OF A

FIGURE VIEWING FROM
ARROW DIRECTION OF A

FIGURE VIEWING FROM
ARROW DIRECTION OF A

AUTOMATIC ANALYZER

TECHNICAL FIELD

The present invention relates to an automatic analyzer.

BACKGROUND ART

A system software update cycle has been shortened accompanying with diversification of hardware and software of an inspection system including an automatic analyzer used in an examination room of a hospital or an inspection center and the speed up of technology development. Accordingly, it is required that the automatic analyzer can be connected to a variety of systems.

PTL 1 describes a technique for improving a degree of freedom of arranging positions of a rack conveying unit and a rack collection unit, and improving the degree of freedom of arrangement of a plurality of specific analyzers by changing a combination of specimen rack conveying lines. That is, the rack conveying unit and the rack collection unit may be selected to be arranged adjacent to each other, or may be selected to be arranged at positions between the specimen container conveying units.

CITATION LIST

Patent Literature

PTL 1: Japanese Patent No. 5439107

SUMMARY OF INVENTION

Technical Problem

A specimen conveyed to the automatic analyzer is conveyed to a specimen dispensing position in the automatic analyzer by a specimen container conveying unit.

Thus, an individual automatic analyzer needs to include a specimen container conveying unit suitable for an inspection system connected thereto.

Therefore, when a configuration of the inspection system is to be changed, it is not only necessary to change the inspection system, but also necessary to change the specimen container conveying unit to be suitable for the changed inspection system, and to change a size and an arranging position of a specimen dispensing unit or the like to be suitable for the changed specimen container conveying unit in the automatic analyzer.

It is necessary to change the inspection system, and also to greatly change the arrangement and configuration of each automatic analyzer accompanying the change in the inspection system, leading to an increase in cost.

In addition, the operator needs to memorize a maintenance method corresponding to the automatic analyzer after the configuration is changed, leading to an increase in burden on the operator.

Although the technique described in PTL1 described above may improve the degree of freedom of the arranging positions of the rack conveying unit and the rack collection unit, changes in a configuration of each automatic analyzer accompanying the change of the inspection system when the configuration of a convey line for conveying the specimen to the automatic analyzer is changed are not taken into account.

An object of the invention is to realize an automatic analyzer capable of preventing an increase in cost without greatly changing the configuration even when the configuration of an inspection system is changed, and reducing burden of an operator accompanying a change in the configuration of the inspection system.

Solution to Problem

In order to achieve the above object, the invention is implemented as follows.

The automatic analyzer includes a specimen container conveying unit which conveys a specimen container, a reaction unit which promotes a reaction of a specimen in a reaction container installed in the reaction unit, a specimen dispensing unit which sucks a specimen from a specimen container positioned at a predetermined specimen suction position and dispenses the specimen into the reaction container installed in the reaction unit, a measuring unit which measures a reaction solution in the reaction container, and an alignment mechanism that aligns the specimen container conveying unit such that the specimen suction position and a specimen container conveying track of the specimen container conveying unit intersect.

Advantageous Effect

It is possible to realize an automatic analyzer capable of preventing an increase in cost without greatly changing the configuration even when the configuration of an inspection system is changed, and reducing burden of an operator accompanying a change in the configuration of the inspection system.

DESCRIPTION OF EMBODIMENTS

An automatic analyzer will be described as an example in embodiments of the invention. Examples of the automatic analyzer include a biochemical automatic analyzer, an immunological automatic analyzer, and a gene automatic analyzer. However, these are merely examples of the invention and the invention is not limited to the embodiments described below. The invention extensively includes a device that allows a sample and a reagent to react and analyzes the sample based on a reaction result.

For example, the invention may include a mass spectrometer and a coagulation analyzer that measures blood coagulation time for a clinical examination. In addition, the invention may also be applied to a combined system that combines the mass spectrometer and the coagulation analyzer with a biochemical automatic analyzer, an immunological automatic analyzer and the like, or an automatic analysis system to which the devices are applied.

Hereinafter, embodiments of the invention will be described with reference to the accompanying drawings.

EMBODIMENTS

Embodiment 1

Figure 1:
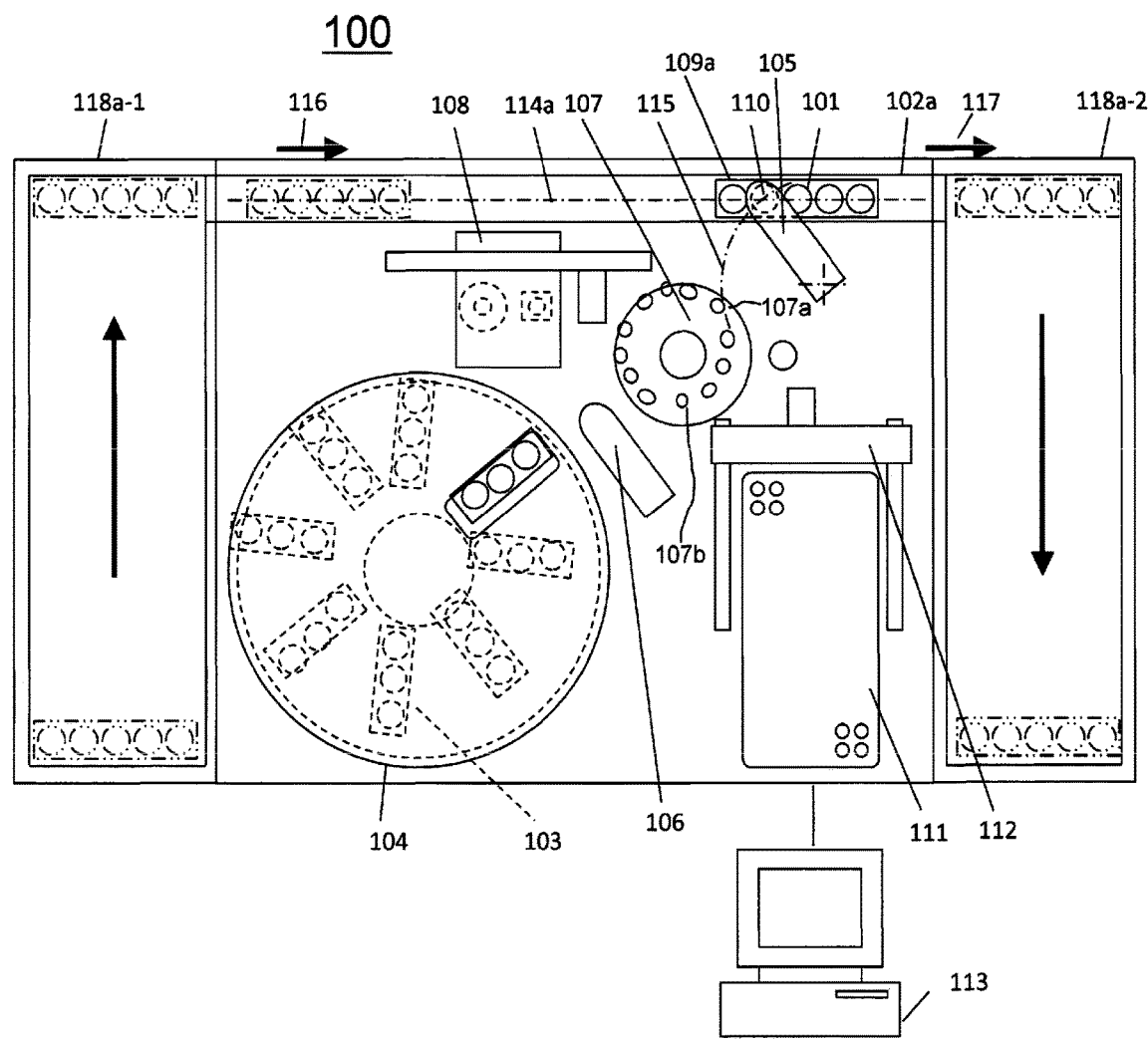
FIG. 1 is a schematic configuration diagram of an automatic analyzer of Embodiment 1.

FIG. 1 is a schematic configuration diagram of an automatic analyzer 100 of Embodiment 1.

In FIG. 1, the automatic analyzer 100 includes a specimen container conveying unit 102a that conveys a specimen container 101 such as a blood collection tube containing a sample to be analyzed to a specimen suction position (specimen dispensing position) 110, a reagent storage unit 104 in which a reagent container 103 containing a reagent to be used for analysis is installed, a specimen dispensing unit 105 that dispenses a sample in the specimen container 101 to a reaction container 107b positioned at a sample discharge position 107a using a specimen dispensing nozzle (not shown), and a reagent dispensing unit 106 that dispenses the reagent in the reagent container 103 into the reaction container 107b.

In addition, the automatic analyzer 100 includes a reaction promoting unit (reaction unit) 107 that is installed with the reaction container 107b for accommodating a reaction solution in which a specimen and a reagent are mixed, and controls a temperature of the reaction solution to fall within a certain temperature range, and a measuring unit 108 that optically measures an amount of a substance in the reaction solution whose reaction has been promoted by reaction promoting unit 107. These units are controlled by a control device 113.

The reagent storage unit 104 may have, for example, a configuration in which a plurality of reagent containers 103 are arranged on a circumference and any reagent container 103 is conveyed to a desired position by rotating the reagent storage unit 104, or a configuration in which the reagent containers 3 are arranged in a single row or a plurality of rows vertically and horizontally.

The measuring unit 108 performs an optical measurement on the reaction solution in a measurement flow path in the measuring unit 108. Examples of a measurement operation of the measuring unit 108 include measurement of an absorbance of the reaction solution, measurement of a luminescence amount when the reagent is added to the reaction solution and a voltage is applied, measurement of a particle number in the reaction solution, or measurement of a change in a current value or a voltage value when the reaction solution is in contact with an electrode film.

Therefore, a photometry device such as a photomultiplier tube and a photometer, an imaging element such as a CCD, an ammeter and a voltmeter for measuring a change in a current value and a voltage value, and the like are provided in the measuring unit 108.

The reaction promoting unit 107 keeps a temperature of the reaction container 107b within a predetermined temperature range, thereby promoting a stable reaction. For example, the reaction promoting unit may be an incubator for temperature control by heating the surroundings using a heater or the like in a state where a plurality of reaction containers 107b are arranged on a circumference, or a thermostatic tank in which the reaction container is immersed and a liquid controlled to a certain temperature range is circulated.

Depending on an analysis performance required for the automatic analyzer 100, in consideration of an influence of carry-over between specimens, a dispensing tip may be used, which can be replaced every time it comes into contact with the specimen when the specimen dispensing unit 105 dispenses a specimen, or an unused reaction container 107b may be used each time as the reaction container 107b for reacting a specimen and a reagent.

At this time, the dispensing tip or the reaction container 107b used once is discarded. A new dispensing tip or reaction container 107b necessary to perform an analysis for a period of time is stored in a consumable article storage unit 111, and is supplied to a location, where the new dispensing tip or reaction container 107b is to be used, by a consumable article conveying unit 112 at a proper time.

The specimen container conveying unit 102a uses a convey belt mechanism to convey, for example, a specimen rack 109a carrying one or a plurality of specimen containers 101 to a suction position of the specimen dispensing unit 105 along a linear conveying track 114a.

An intersection point or a contact point between the conveying track 114a of the specimen container 101 of the specimen container conveying unit 102a and a moving track 115 of a dispensing nozzle of the specimen dispensing unit 105 is the specimen suction position 110. Therefore, the specimen container conveying unit 102a is installed such that the conveying track 114a of the specimen container conveying unit 102a intersects the predetermined specimen suction position 110. The moving track 115 of the dispensing nozzle is a track passing through the specimen suction position 110 and the sample discharge position 107a.

As the specimen container 101 that can be used in the automatic analyzer 100, a plurality of types of specimen containers 101 can be used instead of a single type of specimen container 101.

In an example shown in FIG. 1, the specimen containers 101 are carried on the specimen rack 109a, on which five specimen containers 101 can be carried, for conveying.

In a case of the example shown in FIG. 1, the specimen rack 109a is carried into the automatic analyzer 100 from a specimen conveying system 118a-1 connected to a left side of the automatic analyzer 100 in FIG. 1, then moved in a direction indicated by an arrow 116 by the specimen container conveying unit 102a of the automatic analyzer 100 and finally conveyed to the specimen dispensing position 110.

After the specimen is dispensed at the specimen dispensing position 110, the specimen rack 109a is moved in a direction indicated by an arrow 117, conveyed to a specimen conveying system 118a-2 connected to a right side of the automatic analyzer 100 in FIG. 1, and finally carried out from the automatic analyzer 100.

Here, it is necessary to change a carrying-in direction of the specimen container 101 to the automatic analyzer 100 and a carrying-out direction of the specimen container 101 from the automatic analyzer 100 in accordance with the specimen conveying system (the specimen conveying systems 118a-1 and 118a-2 in the example shown in FIG. 1) of an inspection system connected to the automatic analyzer 100.

Therefore, there are a plurality of types of specimen container conveying units.

Figure 3:
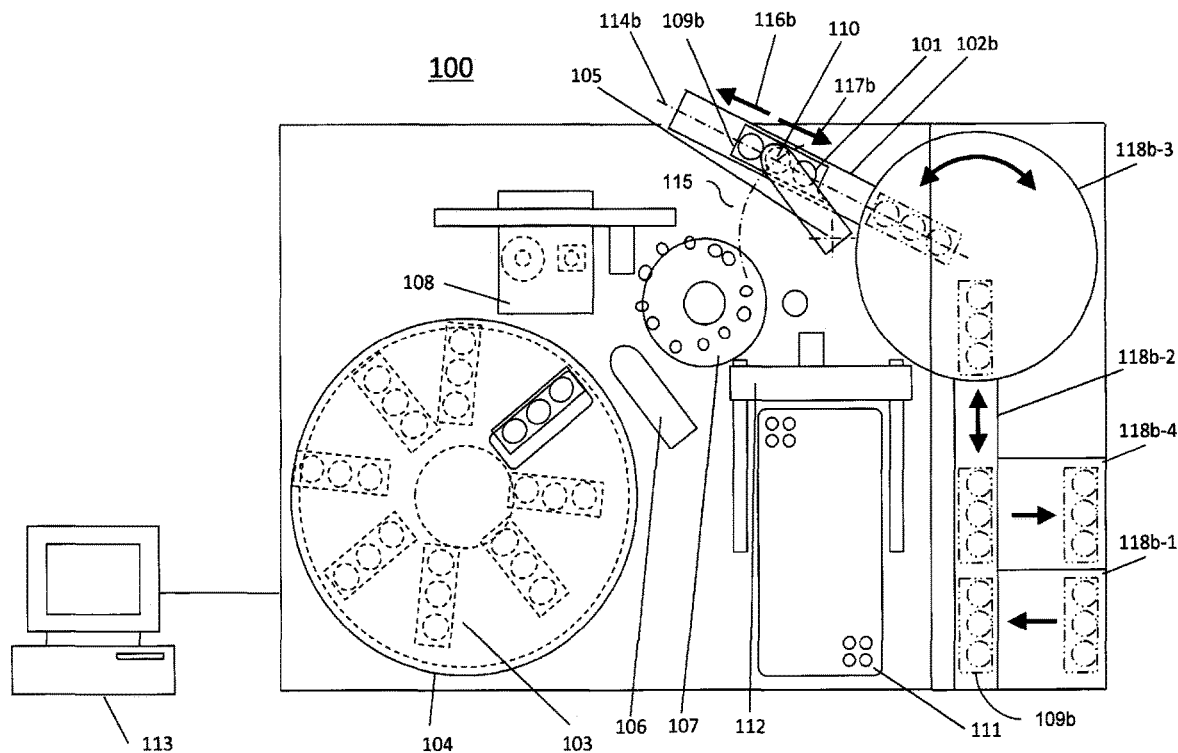
FIG. 3 is a schematic configuration diagram of an automatic analyzer where another specimen conveying system different from the example shown in FIG. 1 is applied in Embodiment 1.

FIG. 3 is a schematic configuration diagram of the automatic analyzer 100 in Embodiment 1 where a specimen conveying system different from the example shown in FIG. 1 is applied. In FIG. 3, a specimen rack 109b, carrying one or a plurality of specimen containers 101, is charged from a specimen conveying system 118b-1 connected to the right side of the automatic analyzer 100, carried into a specimen container conveying unit 102b of the automatic analyzer 100 via specimen conveying systems 118b-2 and 118b-3, and then conveyed to the specimen dispensing position 110 along a linear conveying track 114b.

After the specimen is dispensed at the detection dispensing position 110, the specimen rack 109b is conveyed in a direction 117b opposite to a convey direction 116b to the specimen dispensing position 110, and returns to the same location where the specimen container 101 is carried in from the specimen conveying system 118b-3, and is then carried out from the automatic analyzer 100. Thereafter, the specimen rack 109b is collected by a specimen conveying system 118b-4 through the specimen conveying systems 118b-3 and 118b-2.

Figure 2:
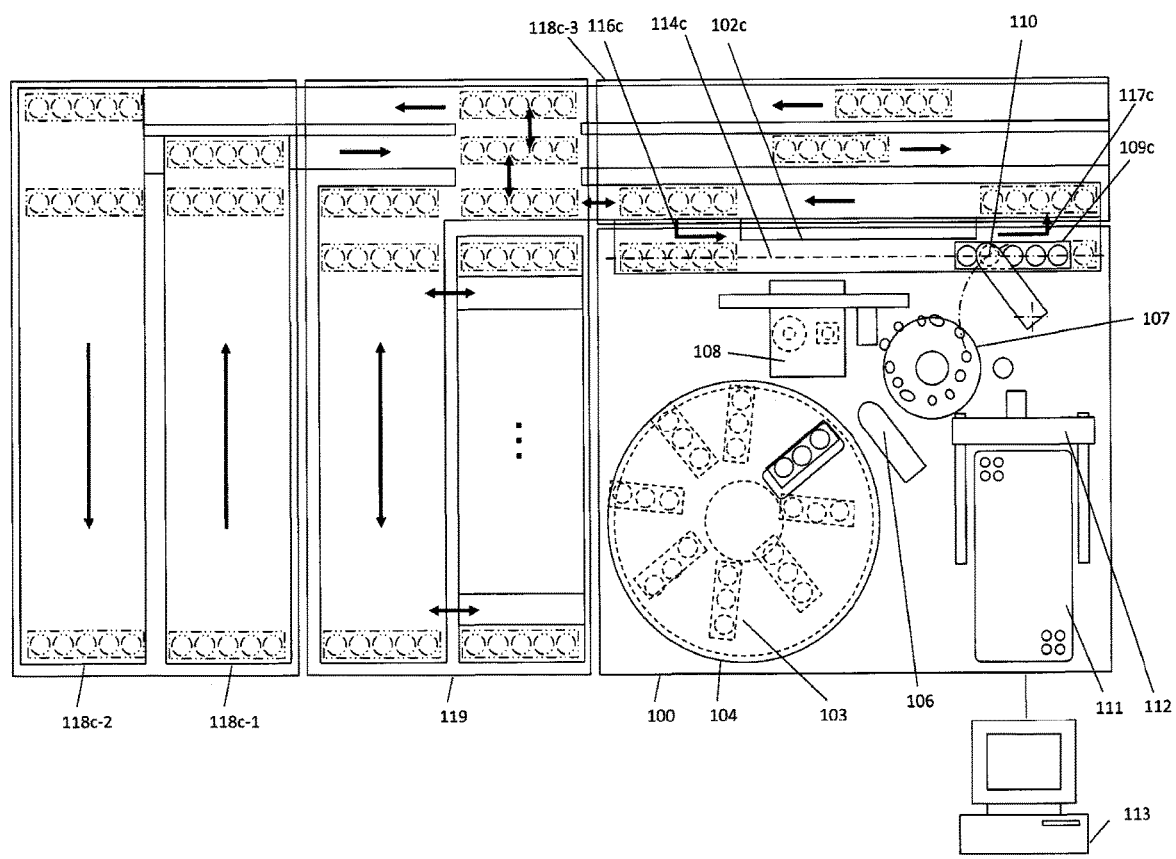
FIG. 2 is a schematic configuration diagram of an automatic analyzer where a specimen conveying system different from the example shown in FIG. 1 is applied in Embodiment 1.

In the example shown in FIG. 1, although the specimen rack 109a is carried in from the specimen conveying system 118a-1 connected to the left side of the automatic analyzer 100, and is carried out from the specimen conveying system 118a-2 connected to the right side, there are also cases such as an example shown in FIG. 2.

FIG. 2 is a schematic configuration diagram of the automatic analyzer where another specimen conveying system different from the example shown in FIG. 1 is applied in Embodiment 1. In FIG. 2, in a case, a specimen rack 109c is carried into a specimen container conveying unit 102c of the automatic analyzer 100 from specimen conveying systems 118c-1 and 118c-3 connected to the left side of the automatic analyzer 100, and is then moved as indicated by an arrow 116c, moved along a conveying trajectory 114c, and moved as indicated by an arrow 117c from the detection suction position 110, and then is carried out from the specimen conveying system 118c-2 connected to the left side of the automatic analyzer 100.

In addition, a buffer area 119 for temporarily storing the specimen rack 109c in which the specimen container 101 is installed is provided. In a case, the specimen rack 109c is conveyed from the buffer area 119 to the automatic analyzer 100, and in another case, the specimen rack 109c is conveyed from the automatic analyzer 100 to the buffer area 119.

Although the specimen container conveying units 102a, 102b, and 102c having different shapes, components, and structures are used in the automatic analyzer shown in FIGS. 1, 2, and 3, the specimen suction position 110, which is an intersection point or a contact point between the track 115 of the dispensing nozzle of the specimen dispensing unit 105 and each of the conveying tracks 114a, 114b and 114c of respective specimen containers 101 of the specimen container conveying units 102a, 102b, and 102c, is arranged such that relative positions of the specimen suction position 110 and other units constituting the automatic analyzer 100 are the same.

Figure 4A:
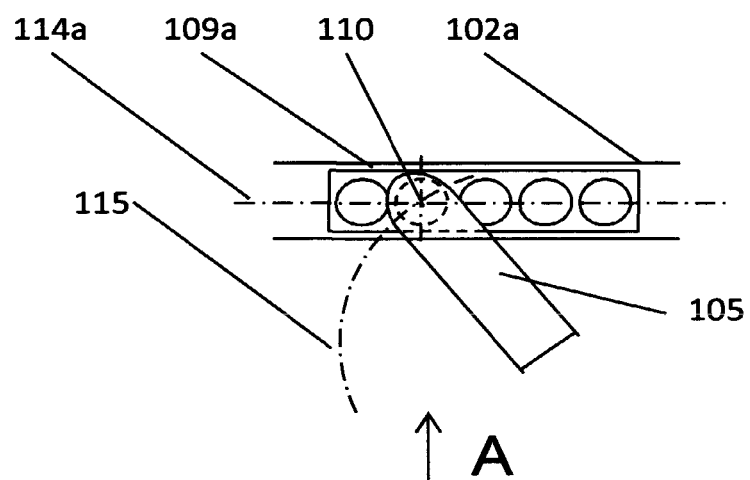
FIG. 4A is an illustration of a configuration that enables a specimen suction position and a specimen container conveying track of a specimen container conveying unit to certainly intersect when mounting the specimen container conveying unit to an automatic analyzer.
Figure 4B:
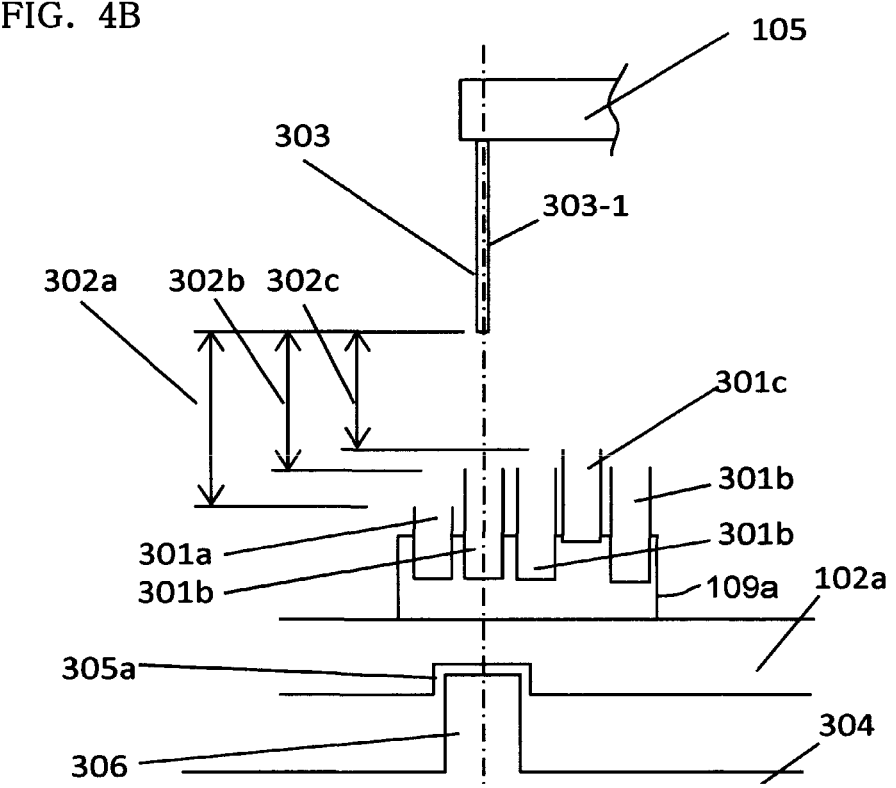
FIG. 4B is an illustration of a configuration that enables a specimen suction position and a specimen container conveying track of a specimen container conveying unit to certainly intersect when mounting the specimen container conveying unit to an automatic analyzer.

FIGS. 4A and 4B illustrate a configuration that enables the specimen suction position 110 and the conveying track 114a of the specimen container 101 of the specimen container conveying unit 102a to certainly intersect when mounting the specimen container conveying unit 102a to the automatic analyzer 100 in the example shown in FIG. 1.

FIG. 4A is a plan view showing the specimen dispensing unit 105 at a position where the specimen is sucked from the specimen suction position 110 and a state where the second specimen container 101 from the left in FIG. 4A of the plurality of specimen containers 101 on the specimen rack 109a is positioned at the specimen suction position 110.

In addition, FIG. 4B shows an arrow view as viewed from a direction A in the plan view shown in FIG. 4A.

In FIG. 4B, a pin 306 protruding upward is formed below the specimen suction position 110 and on a mounting surface 304 of the specimen container conveying unit 102a of the automatic analyzer 100. A shape of the pin 306 may be a cylindrical shape or a prismatic shape. As an example of a size of the pin 306, one having a diameter of 10 mm and a height of 10 mm may be considered, or other sizes may be used.

A hole 305a into which the pin 306 is inserted is formed in a back surface of the specimen container conveying unit 102a which is a surface facing the mounting surface 304 of the automatic analyzer 100. The hole 305a may have a circular shape or a polygonal shape, or may have a shape similar to that of the pin 306.

The specimen dispensing unit 105 has a specimen dispensing nozzle 303 extending in a downward direction for dispensing a specimen, and the pin 306 is formed at a position where an extension line of a central axis 303-1 of the specimen dispensing nozzle 303 is parallel to a central axis of the pin 306 when the specimen dispensing nozzle 303 is positioned at the specimen suction position 110.

When mounting the specimen container conveying unit 102a to the automatic analyzer 100, the pin 306 is fitted into the hole 305a formed in the specimen container conveying unit 102a, whereby the pin 306 and the hole 305a form an alignment mechanism of the specimen container conveying unit 102a, and the specimen container conveying unit 102a can be arranged at an appropriate position.

Although not shown, the specimen container conveying unit 102a has a convey belt or the like for conveying the specimen rack 109a in a state where the pin 306 is fitted into the hole 305a, and can position each of the plurality of specimen containers 101 carried on the specimen rack 109a at the specimen suction position 110.

Figure 5A:
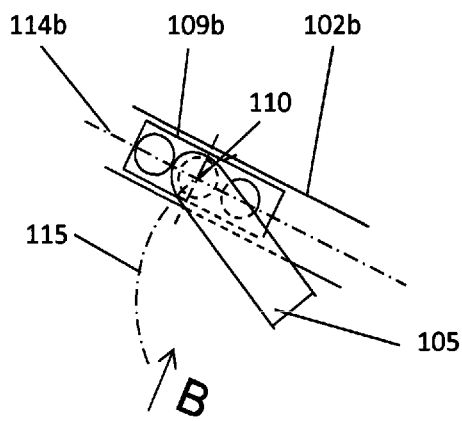
FIG. 5A is an illustration of a configuration that enables a specimen suction position and a specimen container conveying track of another specimen container conveying unit to certainly intersect when mounting the specimen container conveying unit to an automatic analyzer.
Figure 5B:
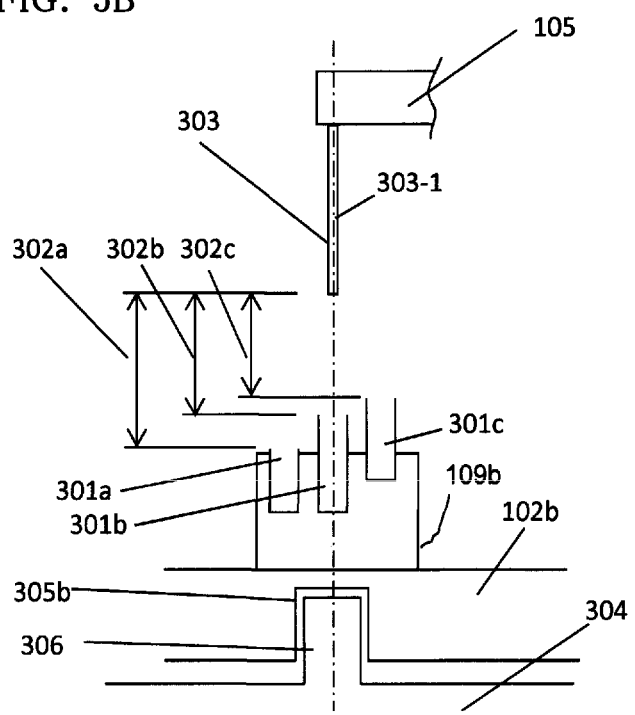
FIG. 5B is an illustration of a configuration that enables a specimen suction position and a specimen container conveying track of another specimen container conveying unit to certainly intersect when mounting the specimen container conveying unit to an automatic analyzer.

FIGS. 5A and 5B illustrates a configuration that enables the specimen suction position 110 and the conveying track 114b of the specimen container 101 of the specimen container conveying unit 102b to certainly intersect when mounting the specimen container conveying unit 102b to the automatic analyzer 100.

FIG. 5A is a plan view showing the specimen dispensing unit 105 at a position where the specimen is sucked from the specimen suction position 110 and a state where the second specimen container 101 from the left in FIG. 5A of the plurality of specimen containers 101 on the specimen rack 109b is positioned at the specimen suction position 110.

In addition, FIG. 5B shows an arrow view as viewed from a direction B in the plan view shown in FIG. 5A.

In FIG. 5B, as described above, the pin 306 protruding upward is formed below the specimen suction position 110 and on the mounting surface 304 of the specimen container conveying units 102a and 102b of the automatic analyzer 100.

Then, a hole 305b into which the pin 306 is inserted is formed in a back surface of the specimen container conveying unit 102b which is a surface facing the mounting surface 304 of the automatic analyzer 100.

The hole 305b may have a circular shape or a polygonal shape, and may have a shape similar to that of the pin 306.

The pin 306 is formed at a position where the extension line of the central axis 303-1 of the specimen dispensing nozzle 303 is parallel to the central axis of the pin 306 when the specimen dispensing nozzle 303 of the specimen dispensing unit 105 is positioned at the specimen suction position 110.

When mounting the specimen container conveying unit 102b to the automatic analyzer 100, the pin 306 and the hole 305b form an alignment mechanism of the sample container conveying unit 102b, and the pin 306 is fitted into the hole 305b formed in the specimen container conveying unit 102b, whereby the specimen container conveying unit 102b can be arranged at an appropriate position.

Although not shown, the specimen container conveying unit 102b has a convey belt or the like for conveying the specimen rack 109b in a state where the pin 306 is fitted into the hole 305b, and can position each of the plurality of specimen containers 101 carried on the specimen rack 109b at the specimen suction position 110.

Here, in the automatic analyzer 100, a plurality of types of specimen containers 101 can be used.

As shown in FIGS. 4A, 4B, 5A, and 5B, even for the specimen container conveying units 102a and 102b different in types from each other, the specimen dispensing nozzle 303 of the specimen dispensing unit 105 and the specimen container 101 can be configured to have the same relative position in a direction of gravity if the sample containers 101 are of the same type. For example, in a case of the specimen container conveying unit 102a used after carrying the specimen container 101 on the specimen rack 109a and in a case of the specimen container conveying unit 102b used after carrying the specimen container 101 on the specimen rack 109b, distances 302a between the specimen dispensing nozzle 303 and specimen containers 301a can be the same distance if the specimen containers 301a are of the same type.

The specimen container 301a can have the same distance 302a by adjusting a depth size of the hole 305a of the specimen container conveying unit 102a and a depth size of the hole 305b of the specimen container conveying unit 102b.

Similarly, a container 301b can has a distance 302b and a container 301c can has a distance 302c.

With the above configuration, it is possible to make relative positions between components, that is, between the specimen dispensing unit 105 and the specimen container conveying unit 102a or 102b during a specimen dispensing operation, or drive conditions when moving each axis of the specimen dispensing unit 105 identical even when the types of the specimen container conveying unit are different, and it is possible to ensure stability of the same specimen dispensing operation before and after changing the specimen container conveying unit.

In addition, a positional relationship between the specimen container conveying units 102a and 102b and the dispensing nozzle 303 can be more accurately matched during the specimen dispensing operation performed by the specimen dispensing unit 105.

In the automatic analyzer 100 shown in FIGS. 1, 2, and 3, as a unit that is a target of maintenance work by an operator, for example, the specimen dispensing unit 105 relating to cleaning or replacement of the specimen dispensing nozzle 303, replacement work of consumable articles, and the like and the consumable article storage unit 111, units having the same configuration are used, and the relative positions between the units are the same.

Therefore, although it is necessary for the operator to newly memorize a procedure of maintenance work relating to the specimen container conveying unit 102a or 102b, maintenance work procedures relating to other units of the automatic analyzer 100 are not changed, so it is not necessary to memorize new work procedures and the like of the other units, and thus burden of the operator accompanying a change in the inspection system can be reduced.

Since the configuration in the case of the specimen container conveying unit 102c shown in FIG. 2 is the same as that shown in FIGS. 4A and 4B, illustration and detailed description are omitted.

The specimen container conveying units 102a and 102b shown in FIGS. 4A, 4B, 5A and 5B have a structure for moving the specimen racks 109a and 109b, carrying the specimen containers 101, to a rack convey surface. However, the invention is not limited to the structure.

Figure 6A:
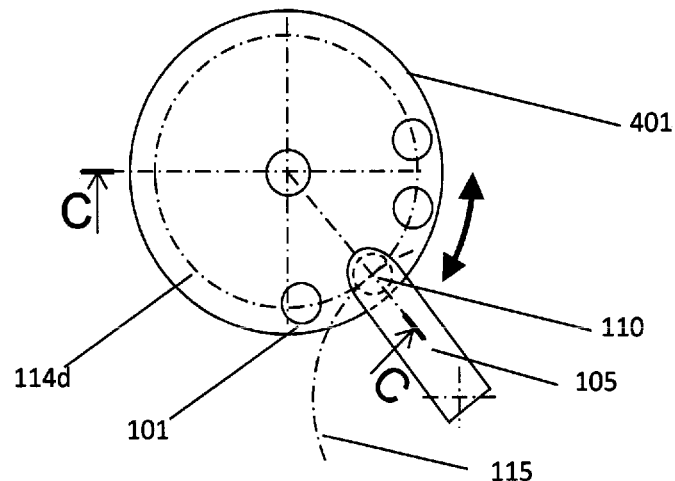
FIG. 6A is an illustration of a configuration that enables a specimen suction position and a specimen container conveying track of further another specimen container conveying unit to certainly intersect when mounting the specimen container conveying unit to an automatic analyzer.
Figure 6B:
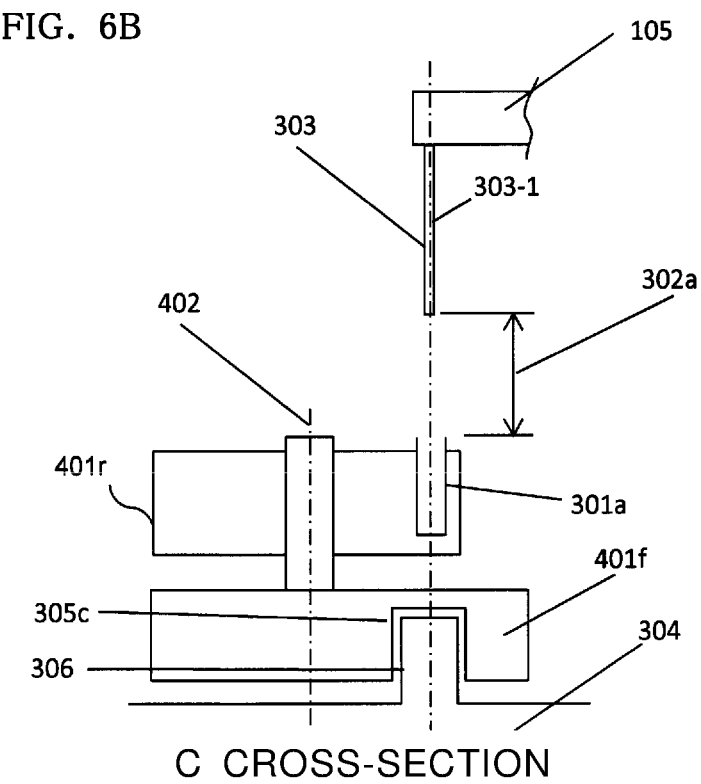
FIG. 6B is an illustration of a configuration that enables a specimen suction position and a specimen container conveying track of further another specimen container conveying unit to certainly intersect when mounting the specimen container conveying unit to an automatic analyzer.

FIGS. 6A and 6B illustrates a configuration that enables the specimen suction position 110 and a circular conveying track 114d of the specimen container 101 of a specimen detection container conveying unit 401 to certainly intersect when mounting the specimen detection container conveying unit 401 having a disk shape (circular) that is different from the structure of the specimen container conveying units 102a and 102b to the automatic analyzer 100.

FIG. 6A is a plan view showing the specimen dispensing unit 105 at the position where the specimen is sucked from the specimen suction position 110 and a state where one specimen container 101 of a plurality of specimen containers 101 on the specimen container conveying unit 401 is positioned at the specimen suction position 110.

In addition, FIG. 6B shows a simplified cross-sectional view taken along a line C-C of the plan view shown in FIG. 6A.

As shown in FIG. 6A, a plurality of specimen containers 101 are installed on a circumference of the circular specimen container conveying unit 401, and the specimen containers 101 are conveyed along the conveying track 114d in a circumferential direction.

As shown in FIG. 6B, the specimen container conveying unit 401 includes a fixed portion 401f and a rotating portion 401r. A hole 305c for fitting with the pin 306 formed on the mounting surface 304 of the automatic analyzer 100 is formed in a bottom surface of the fixed portion 401f.

The hole 305c and the pin 306 fitted therewith form an alignment mechanism of the specimen container conveying unit 401. The rotating portion 401r rotates about a disk rotation central axis 402 attached to the fixed portion 401f, and conveys the specimen container 101 to the specimen suction position 110.

In the example shown in FIGS. 6A and 6B, the specimen dispensing nozzle 303 of the specimen dispensing unit 105 and the specimen container 101 can be configured to have a same relative position in a direction of gravity if the specimen containers 101 are of the same type.

For example, the distance 302a between the specimen dispensing nozzle 303 and the specimen container 301a can be the same distance as that of the specimen container conveying units 102a and 102b if the specimen containers 301a are of the same type. That is, the specimen container 301a can have the same distance 302a by adjusting a depth size of the hole 305c of the fixed portion 401f.

As described above, according to Embodiment 1, since the pin 306 to be fitted into the holes 305a, 305b and 305c formed in the specimen container conveying units 102a, 102b, 102c and 401 is formed on the specimen container conveying unit mounting surface 304 at a position downward the specimen suction position 110, it is possible to make relative positions between components, that is, between the specimen dispensing unit 105 and the specimen container conveying units 102a, 102b, 102c and 401 during the specimen dispensing operation, or driving conditions when moving each axis of the specimen dispensing unit 105 identical even when the types of the specimen container conveying unit are different, and it is possible to ensure stability of the same specimen dispensing operation before and after changing the specimen container conveying units.

In addition, although it is necessary for the operator to newly memorize the procedure of maintenance work relating to the specimen container conveying units 102a, 102b, 102c and 401, maintenance work procedures relating to other units of the automatic analyzer 100 are not changed, so it is not necessary to memorize new work procedures and the like of the other units, and thus burden of the operator accompanying a change in the inspection system can be reduced.

Thus, it is possible to realize an automatic analyzer capable of preventing an increase in cost without greatly changing the configuration even when the configuration of the inspection system is changed, and reducing the burden of the operator accompanying a change in the configuration of the inspection system.

Embodiment 2

Next, Embodiment 2 will be described.

Figure 7A:
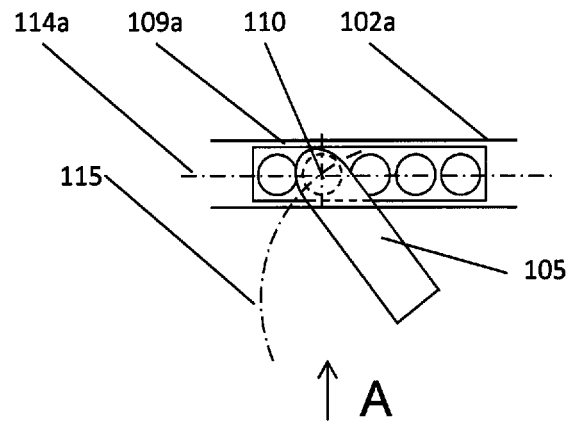
FIG. 7A is an illustration of a configuration that enables a specimen suction position and a specimen container conveying track of a specimen container conveying unit to certainly intersect when mounting the specimen container conveying unit to an automatic analyzer in Embodiment 2.
Figure 7B:
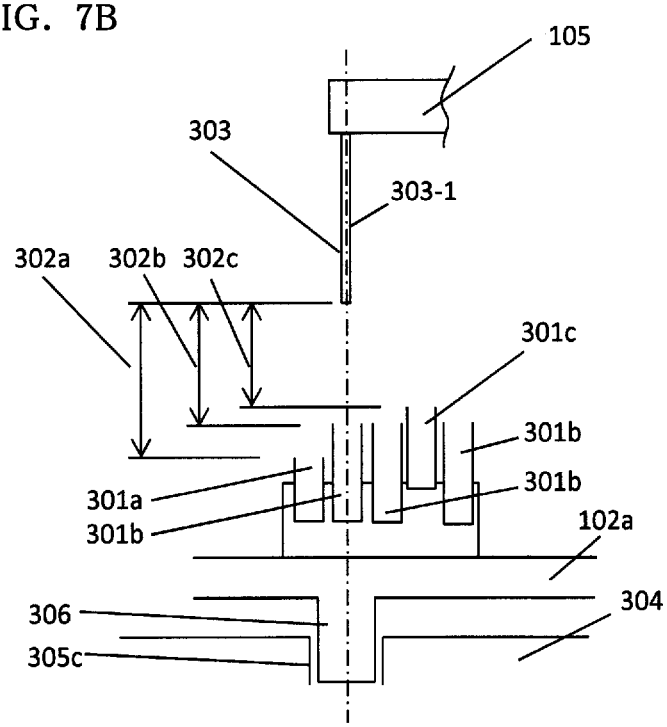
FIG. 7B is an illustration of a configuration that enables a specimen suction position and a specimen container conveying track of a specimen container conveying unit to certainly intersect when mounting the specimen container conveying unit to an automatic analyzer in Embodiment 2.

FIGS. 7A and 7B illustrates a configuration that enables the specimen suction position 110 and the conveying track 114a of the specimen container 101 of the specimen container conveying unit 102a to certainly intersect when mounting the specimen container conveying unit 102a to the automatic analyzer 100 in Embodiment 2.

FIG. 7A is a plan view showing the specimen dispensing unit 105 at a position where the specimen is sucked from the specimen suction position 110 and a state where the second specimen container 101 from the left in FIG. 7A of the plurality of specimen containers 101 on the specimen rack 109a is positioned at the specimen suction position 110.

In addition, FIG. 7B shows an arrow view as viewed from a direction A in the plan view shown in FIG. 7A.

The hole 305c is formed below the specimen suction position 110 and in the mounting surface 304 of the specimen container conveying unit 102a of the automatic analyzer 100. A shape of the hole 305c may be a cylindrical shape or a prismatic shape. As an example of a size of the hole 305c, one having a diameter of 10 mm and a height of 10 mm may be considered, or other sizes may be used.

In addition, the pin 306 to be inserted into the hole 305c is formed on the back surface of the specimen container conveying unit 102a which is the surface facing the mounting surface 304 of the automatic analyzer 100. The pin 306 may have a circular shape or a polygonal shape, and may have a shape similar to that of the hole 305c.

The pin 306 is formed at a position where the extension line of the central axis 303-1 of the specimen dispensing nozzle 303 is parallel to the central axis of the pin 306 when the specimen dispensing nozzle 303 of the specimen dispensing unit 105 is positioned at the specimen suction position 110.

When mounting the specimen container conveying unit 102a to the automatic analyzer 100, the pin 306 and the hole 305c form an alignment mechanism of the specimen container conveying unit 102a, and the pin 306 is fitted into the hole 305c formed in the mounting surface 304, whereby the specimen container conveying unit 102a can be arranged at an appropriate position.

Other configurations are the same as those of Embodiment 1, and thus illustration and detailed description are omitted.

Although the specimen container conveying unit 102a has been described, Embodiment 2 also includes an example in which the downwardly extending pin 306 as shown in FIG. 7B is formed on the specimen container conveying units 102b, 102c, and 401, and the hole 305c is formed in the mounting surface 304.

In Embodiment 2, the same effect as that of Embodiment 1 can be obtained.

Embodiment 3

Next, Embodiment 3 will be described.

In the above-described Embodiments 1 and 2, the positions of the specimen container conveying units 102a, 102b, 102c, and 401 and the pin 306 or the hole 305c provided on the mounting surface 304 of the specimen container conveying unit of the automatic analyzer 100 consist with the extension line of the axis 303-1 of the specimen dispensing nozzle 303 positioned at the specimen suction position 110.

However, if the specimen container conveying units 102a, 102b, 102c, and 401 can be positioned such that the specimen suction position 110 and the conveying tracks 114a, 114b, 114c, and 114d of the specimen container conveying units 102a, 102b, 102c, and 401 intersect at the specimen suction position 110, the position of the pin 306 or the hole 305c does not have to consist with the extension line of the axis 303-1 of the specimen dispensing nozzle 303 positioned at the specimen suction position 110.

Embodiment 3 is an example where a formation position of a pin or a hole does not consist with the extension line of the axis 303-1 of the specimen dispensing nozzle 303.

Figure 8:
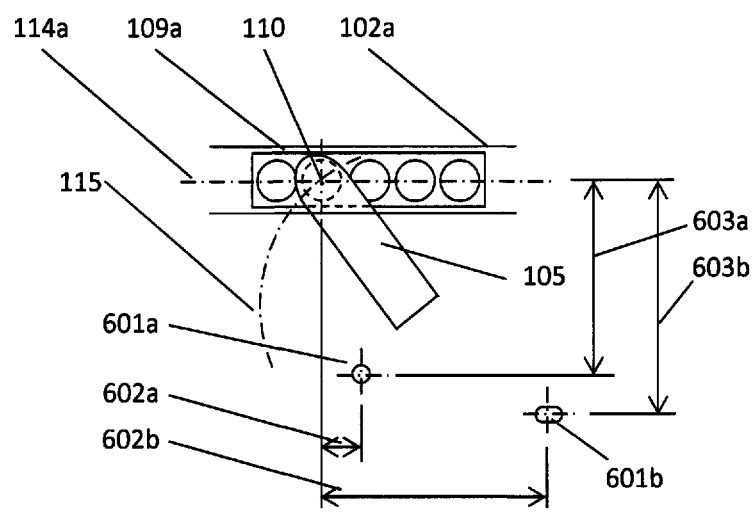
FIG. 8 is an illustration of Embodiment 3, and is a schematic plan view of an example where a formation position of a pin or a hole for a specimen container conveying unit does not consist with an extension line of an axis of a specimen dispensing nozzle.
Figure 9:
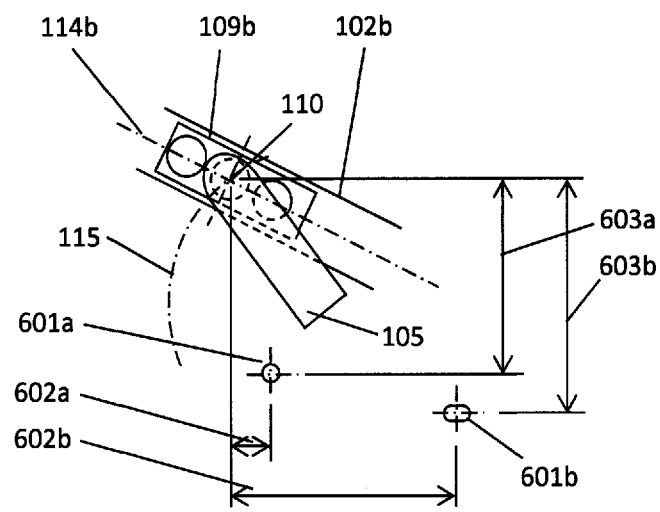
FIG. 9 is an illustration of Embodiment 3, and is a schematic plan view of an example where a formation position of a pin or a hole for another specimen container conveying unit does not consist with an extension line of an axis of a specimen dispensing nozzle.

FIG. 8 is an illustration of Embodiment 3, and is a schematic plan view of an example where a formation position of a pin or a hole for the specimen container conveying unit 102a does not consist with the extension line of the axis 303-1 of the specimen dispensing nozzle 303, and FIG. 9 is a schematic plan view of an example similar to FIG. 8 in which a pin or a hole for the specimen container conveying unit 102b does not consist with the extension line of the axis of the specimen dispensing nozzle.

FIG. 8 is a view in which 601a and 601b are positions where the pin 306 and the hole 305a are formed as shown in FIG. 4B are shown from above.

The combination position 601a of the pin and the hole indicates a position where the pin 306 is formed on the mounting surface 306 and the hole 305a is formed in the back surface of the specimen container conveying unit 102a.

The position 601a is a position having a horizontal distance of 602a from an origin point on a paper surface of FIG. 8, and a vertical distance of 603a from the origin point on the paper surface of FIG. 8, the specimen suction position 110 being the origin point (a position separated by a certain horizontal distance from the specimen suction position 110).

The combination position 601b of the pin and the hole also indicates a position where the pin 306 is formed on the mounting surface 306 and the hole 305a is formed in the back surface of the specimen container conveying unit 102a.

Also, the position 601b is a position having a horizontal distance of 602b from the origin point on the paper surface of FIG. 8, and a vertical distance of 603b from the origin point on the paper surface of FIG. 8, the specimen suction position 110 being the origin point.

In FIG. 9, the combination position 601a of the pin and the hole indicates a position where the pin 306 is formed on the mounting surface 306 and the hole 305a is formed in the back surface of the specimen container conveying unit 102b.

Similar to the example shown in FIG. 8, the position 601a is a position having a horizontal distance of 602a from the origin point on a paper surface of FIG. 9, and a vertical distance of 603a from the origin point on the paper surface of FIG. 9, the specimen suction position 110 being the origin point.

The combination position 601b of the pin and the hole also indicates a position where the pin 306 is formed on the mounting surface 306 and the hole 305a is formed in the back surface of the specimen container conveying unit 102a.

Also, similar to the example shown in FIG. 8, the position 601b is a position having a horizontal distance of 602b from the origin point on the paper surface of FIG. 9, and a vertical distance of 603b from the origin point on the paper surface of FIG. 9, the specimen suction position 110 being the origin point.

Other configurations are the same as those of Embodiment 1, and thus illustration and detailed description are omitted.

Although the illustrated example is an example in which the invention is applied to the specimen container conveying units 102a and 102b, Embodiment 3 is also applicable to the specimen container conveying units 102c and 401.

In Embodiment 3, the pin and the hole also form an alignment mechanism of the specimen container conveying units 102a and 102b, and the same effect as that of Embodiment 1can be obtained. In Embodiment 3, alignment of the specimen container conveying units 102a, 102b, 102c, and 401 can be performed with higher accuracy since there are two combination positions of the pin and the hole.

Embodiment 4

Next, Embodiment 4 will be described.

The above-described Embodiments 1 to 3 are examples in which the specimen container conveying unit is aligned by fitting the pin with the hole. However, Embodiment 4 is an example in which the specimen container conveying unit is aligned by using an alignment jig instead of the pin.

FIGS. 10A, 10B, 11A and 11B are illustrations of Embodiment 4.

Figure 10A:
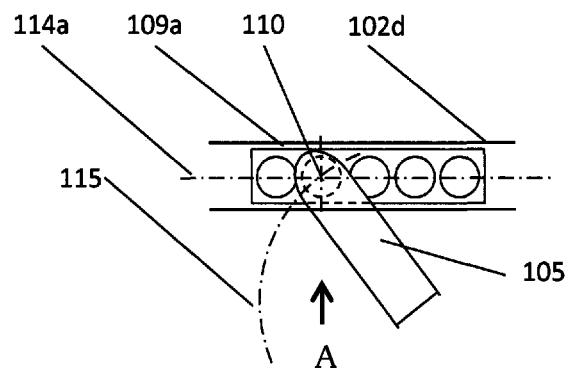
FIG. 10A is an illustration of Embodiment 4.

FIG. 10A is a plan view showing the specimen dispensing unit 105 at a position where the specimen is sucked from the specimen suction position 110 and a state where the second specimen container 101 from the left of the plurality of specimen containers 101 on the specimen rack 109a conveyed by a specimen container conveying unit 102d is positioned at the specimen suction position 110.

Figure 10B:
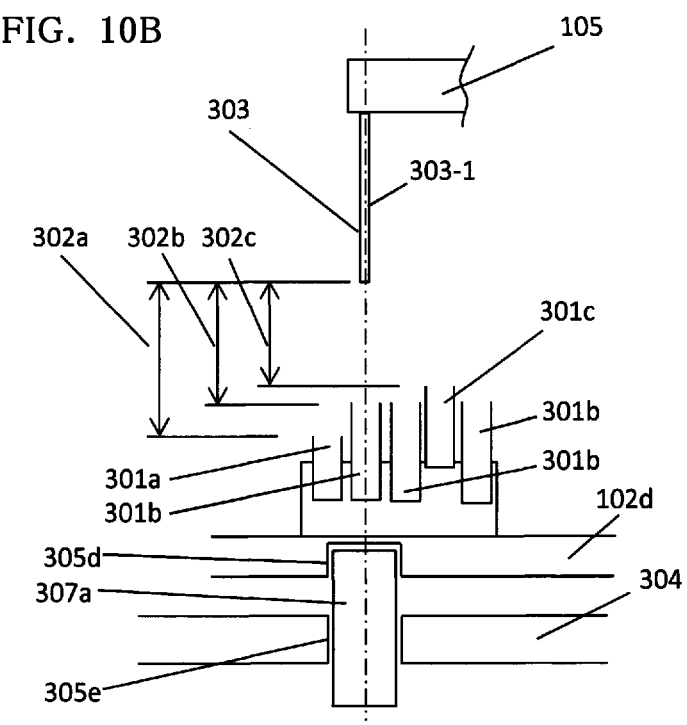
FIG. 10B is an illustration of Embodiment 4.

In addition, FIG. 10B shows an arrow view as viewed from a direction A in the plan view shown in FIG. 10A.

In FIG. 10B, a hole 305e is formed in a mounting surface 304 of the specimen container conveying unit 102d, and a hole 305d is formed in a back surface of the specimen container conveying unit 102d. When the specimen container conveying unit 102d is fixed to the mounting surface 304, the holes 305e and 305d and an alignment jig 307a form an alignment mechanism, and the specimen container conveying unit 102d can be positioned with respect to the specimen suction position 110 by installing the alignment jig 307a into both the holes 305e and 305d. The alignment jig 307a may have a cylindrical shape or a prismatic shape, and the shape of the alignment jig 307a and the shape of the holes 305d and 305e are compatible with each other.

Figure 11A:
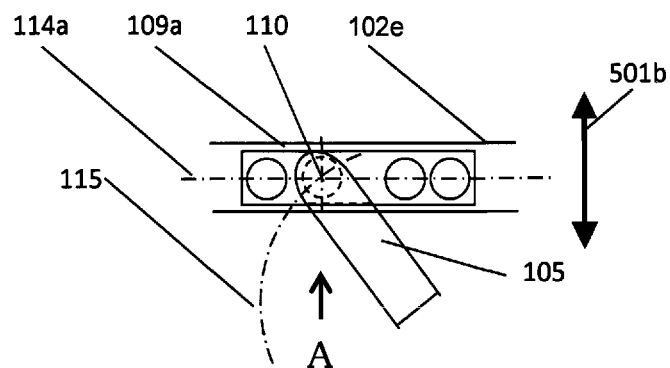
FIG. 11A is an illustration of an alternative of Embodiment 4.

FIG. 11A and FIG. 111B are views showing a modification in which the alignment is performed by using an alignment jig.

FIG. 11A is a plan view showing the specimen dispensing unit 105 at a position where the specimen is sucked from the specimen suction position 110 and a state where the second specimen container 101 from the left of the plurality of specimen containers 101 on the specimen rack 109a conveyed by the specimen container conveying unit 102d is positioned at the specimen suction position 110.

Figure 11B:
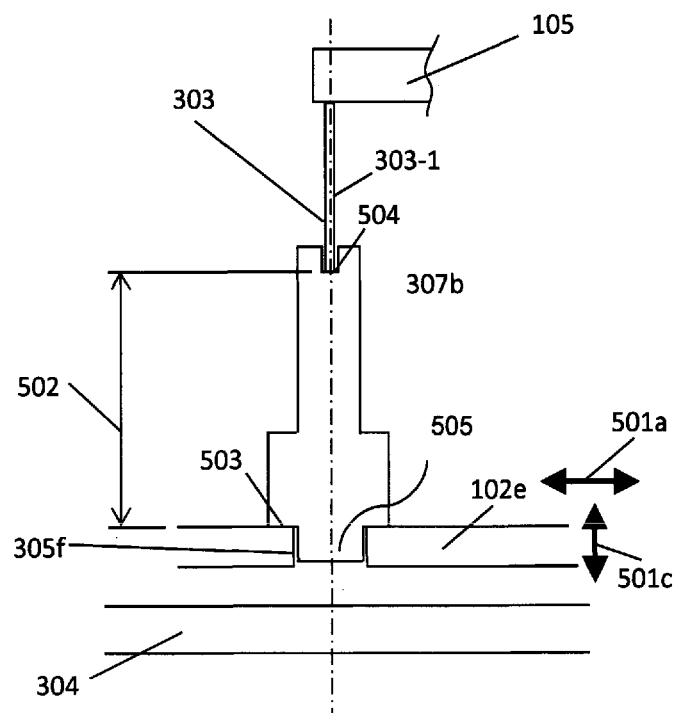
FIG. 11B is an illustration of an alternative of Embodiment 4.

In addition, FIG. 11B shows an arrow view as viewed from a direction A in the plan view shown in FIG. 11A.

In FIG. 11B, a hole 305f is formed in a specimen container conveying unit 102e, and the hole 305f is moved to a position that will be the specimen suction position 110. Adjustment allowances 501a, 501b, and 501c whose positions can be adjusted in the indicated arrow direction are formed in the specimen container conveying unit 102e.

When fixing the specimen container conveying unit 102e to a specimen container conveying unit installing surface of the automatic analyzer 100, a position of the specimen container conveying unit 102e is adjusted and fixed using an alignment jig 307b.

The alignment jig 307b has a settable hole or pin such that the axis 303-1 of the specimen dispensing nozzle 303 is the same as the axis of the hole or pin.

When mounting the specimen container conveying unit 102e to the specimen container conveying unit installing surface of the automatic analyzer 100, the alignment jig 307a and the hole 307f form an alignment mechanism, and a protruding part 505 of the alignment jig 307a is fitted and inserted into the hole 305f of the specimen container conveying unit 102e, and the specimen container conveying unit 102e is moved in a direction of the adjustment allowances 501a and 502b for adjustment, such that the axis of the alignment jig 307b and the axis 303-1 of the dispensing nozzle 303 consist with each other.

The alignment jig 307b has a representative size 502, that is, the distance between the specimen dispensing nozzle 303 and the installing surface of the specimen rack of the specimen container conveying unit 102e. One representative size 502 is, for example, a distance between a tip of the specimen dispensing nozzle 303 and a rack installing surface of the specimen container conveying unit 102e when a reset operation of the automatic analyzer 100 ends.

For example, a surface 504 of a recessed part (in the illustrated example, a bottom surface of the recessed part into which the specimen dispensing nozzle 303 is inserted) is provided, on which the specimen dispensing nozzle 303 can be contacted at a distance equal to the representative size 502 from an installing surface 503 of the alignment jig 307b on the specimen container conveying unit 102, and the position is adjusted by moving the specimen container conveying unit 102e in the direction of the adjustment allowance 501c such that the tip of the specimen dispensing nozzle 303 is brought into contact with the surface 504.

After the position is adjusted by moving the specimen container conveying unit 102e in each direction of the adjustment allowances 501a, 501b, and 501c in the above procedure, the specimen container conveying unit 102e can be fixed.

In Embodiment 4, the same effect as that of Embodiment 1 can be obtained.

According to the above embodiments, since a positioning member such as the pin 306 and the hole 305a fittable with the pin 306 that can position the specimen container conveying unit is provided at the specimen suction position 110, which is the intersection point between the moving track of the nozzle 303 of the detection dispensing unit 105 and the specimen container conveying track of the specimen container conveying unit 102a and the like, it is possible to make the relative positions between components, that is, the specimen dispensing unit 105 and the specimen container conveying units 102a, 102b, 102c, 102d and 401 during the specimen dispensing operation, or driving conditions when moving each axis of the specimen dispensing unit 105 identical even when the types of the specimen container conveying unit are different, and it is possible to ensure stability of the same specimen dispensing operation before and after changing the specimen container conveying units.

In addition, maintenance relating to most of units of the automatic analyzer 100 is not changed, so it is not necessary for the operator to memorize new work procedures and the like of most of the units, and thus the burden of the operator accompanying a change in the inspection system can be reduced.

REFERENCE SIGN LIST

100 Automatic analyzer
101 Specimen container
102a, 102b, 102c, 102d, 102e Specimen container conveying unit
103 Reagent container
104 Reagent storage unit
105 Specimen dispensing unit
106 Reagent dispensing unit
107 Reaction promoting unit
108 Measuring unit
109a, 109b, 109c Specimen rack
110 Specimen suction position
111 Consumable article storage unit
112 Consumable article conveying unit
113 Control device
114a, 114b, 114c Specimen container conveying track 115 Specimen dispensing nozzle moving track
118a-1, 118a-2, 118b-1, 118b-2, 118b-3, 118b-4, 118c-1, 118c-2, 118c-3 Specimen conveying system
119 Buffer area
301a, 301b, 301c Specimen container
303 Specimen dispensing nozzle
304 Specimen container conveying unit mounting surface
305a, 305b, 305c, 305d, 305e, 305f Hole
306 Pin
307a, 307b Alignment jig
401 Specimen container conveying unit
402 Disk rotation central axis
501a, 501b, 501c Adjustment allowance

The invention claimed is:

1. An automatic analyzer comprising:
a specimen container conveying unit which conveys a specimen container along a first track;
a reaction unit which promotes a reaction of a specimen in a reaction container installed in the reaction unit;
a specimen dispensing unit which extends vertically, moves along a second track that intersects the first track, sucks a specimen from a specimen container positioned at a predetermined specimen suction position and has a nozzle that discharges the specimen into the reaction container installed in the reaction unit;
a measuring unit which measures a reaction solution in the reaction container, and
a single housing in which all of the units are mounted, wherein
the housing includes a first alignment portion that, in concert with a second alignment portion on the specimen container conveying unit, aligns the specimen container conveying unit with the housing, the specimen container conveying unit is configured to be exchangeable with a plurality of other specimen container conveying units that are different from each other and the specimen container conveying unit in at least one of structure and components, each of the plurality of other specimen container conveying units having a respective corresponding first track, and a respective corresponding second alignment portion identical to the second alignment portion on the specimen container conveying unit, and has a shape common to the plurality of other specimen container conveying units, and
alignment is performed by the first alignment portion aligning with either the second alignment portion of the specimen container conveying unit or the second alignment portion of one of the other specimen container conveying units such that the second track intersects with either the first track of the specimen container conveying unit or the first track of one of the other specimen container conveying units at a same position regardless of which of the plurality of other specimen container conveying units is exchanged for the specimen container conveying unit.

2. The automatic analyzer according to claim 1, wherein a relationship between the first alignment portion and the second alignment portion is a relationship between a pin and a hole which are fitted into each other.

3. The automatic analyzer according to claim 2, wherein the first alignment portion is the pin, the second alignment portion is the hole, and the pin is formed on a specimen container conveying unit mounting surface of the housing.

4. The automatic analyzer according to claim 2, wherein the first alignment portion is the hole, the second alignment portion is the pin, and the hole is formed in a specimen container conveying unit mounting surface of the housing.

5. The automatic analyzer according to claim 3, wherein the pin is formed below the specimen suction position of the specimen container conveying unit mounting surface of the housing.

6. The automatic analyzer according to claim 4, wherein the hole is formed below the specimen suction position of the specimen container conveying unit mounting surface of the housing.

7. The automatic analyzer according to claim 3, further comprising:

a plurality of pins and a plurality of holes, each of the plurality of pins corresponding to one of the plurality of holes.

8. The automatic analyzer according to claim 7, wherein each of the plurality of pins and each of the plurality of holes is formed at a position separated from the specimen suction position by a certain horizontal distance.

9. The automatic analyzer according to claim 1, further comprising a hole formed in a specimen container conveying unit mounting surface of the housing, a hole formed in the specimen container conveying unit, and an alignment jig to be inserted into the hole formed in the specimen container conveying unit mounting surface and the hole formed in the specimen container conveying unit.

10. The automatic analyzer according to claim 1, wherein the specimen container conveying unit conveys a specimen rack carrying a plurality of the specimen containers along a linear conveying track.

11. The automatic analyzer according to claim 1, wherein the specimen container conveying unit conveys the specimen container along a circular conveying track.

* * * * *